US010531759B2

(12) United States Patent  
Holzbauer

(10) Patent No.: US 10,531,759 B2  
(45) Date of Patent: Jan. 14, 2020

(54) MASTICATING JUICER

(71) Applicant: KONINKLIJKE PHILIPS N.V., Eindhoven (NL)

(72) Inventor: Juergen Holzbauer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 231 days.

(21) Appl. No.: 15/528,881

(22) PCT Filed: Nov. 17, 2015

(86) PCT No.: PCT/EP2015/076748  
§ 371 (c)(1),  
(2) Date: May 23, 2017

(87) PCT Pub. No.: WO2016/083186  
PCT Pub. Date: Jun. 2, 2016

(65) Prior Publication Data  
US 2017/0325616 A1  Nov. 16, 2017

Related U.S. Application Data

(60) Provisional application No. 62/085,296, filed on Nov. 27, 2014.

(30) Foreign Application Priority Data

Dec. 9, 2014 (EP) ..................................... 14197034

(51) Int. Cl.  
*A47J 19/02* (2006.01)  
*A47J 19/00* (2006.01)  
(Continued)

(52) U.S. Cl.  
CPC ............. *A47J 19/025* (2013.01); *A47J 19/06* (2013.01)

(58) Field of Classification Search  
CPC ....................... A47J 19/00–06; A23N 1/00–02  
See application file for complete search history.

(56) References Cited

U.S. PATENT DOCUMENTS 5,906,154 A * 5/1999 Yoon ........................ A23N 1/00  
99/510  
6,854,382 B2 * 2/2005 Jan ........................ A47J 19/025  
99/510  
(Continued)

FOREIGN PATENT DOCUMENTS

CN   203088678 U   7/2013  
TW      352968 U   3/2009  
(Continued)

*Primary Examiner* — Michael A Laflame, Jr.

(57) ABSTRACT

In various embodiments, a masticating juicer may include a housing defining a compression chamber with an inner wall, at least one inlet, at least one juice outlet, and at least one pulp outlet. An auger may be rotatably mounted within the compression chamber and may include upstream and downstream ends and an auger surface in between. The auger may be rotatable about an axis of rotation to masticate and convey material in a downstream direction. The auger may be sized so that a cavity is formed between the auger surface and the inner wall of the compression chamber. An elastic restrictor may extend circumferentially around an interior of the compression chamber to at least partially span the cavity. The elastic restrictor may be shaped to provide variable resistance to material conveyed by the auger depending on a relative position of the material between the inner wall and the auger surface.

12 Claims, 6 Drawing Sheets

(51) Int. Cl.
*A23N 1/02* (2006.01)
*A23N 1/00* (2006.01)
*A47J 19/06* (2006.01)

(56) References Cited

U.S. PATENT DOCUMENTS

| | | | |
|---|---|---|---|
| 10,039,404 B2* | 8/2018 | Kim | A47J 19/025 |
| 2014/0234494 A1* | 8/2014 | Doglioni Majer | A47J 31/369 |
| | | | 426/115 |

FOREIGN PATENT DOCUMENTS

| | | |
|---|---|---|
| WO | 0074502 A1 | 12/2000 |
| WO | 2012173333 A1 | 12/2012 |
| WO | 2012173334 A1 | 12/2012 |

* cited by examiner

MASTICATING JUICER

This application is the U.S. National Phase application under 35 U.S.C. § 371 of International Application No. PCT/EP2015/076748, filed on Nov. 17, 2015, which claims the benefit of U.S. Provisional Application No. 62/085,296 filed on Nov. 27, 2014 and International Application No. 14197034.3 filed on Dec. 9, 2014. These applications are hereby incorporated by reference herein.

TECHNICAL FIELD

The present invention is directed generally to separating liquid from various materials. More particularly, various inventive methods and apparatus disclosed herein relate to a masticating separator for efficiently separating juice from fruits and vegetables.

BACKGROUND

Masticating separators, or "juicers," may be designed to process various material, typically fruits and/or vegetables, to separate juice from pulp. In some masticating juicers, an auger or drill is rotatably mounted within a compression chamber so that its rotation masticates and conveys material downstream towards a pulp outlet while separated juice exits a separate, juice outlet. In order to press juice from pulp, a cavity between an outer surface of the auger and an inner surface of the compression chamber may grow increasingly narrow in a downstream direction, e.g., to between 0.02 and 0.05 mm. Such narrow cavities may be difficult and/or expensive to reliably mass manufacture due to inherent tolerances of individual parts, including the auger and compression chamber housing. Thus, there is a need in the art to reduce the effect that tolerances of individual parts have on such a cavity. There is also a need in the art to more efficiently separate juice from fruits and/or vegetables.

WO2012173334A1 discloses a juice extractor with a function of adjustment of extracting force. A feed screw is adapted to be inserted into a conical strainer to form a passage therebetween. By the rotation of the feed screw, materials of fruits or vegetables are pushed forward through the passage, thereby producing juice. A soft elastic body of a ring shape covers the passage at the exit, so that the residues will not be discharged until the pressure reaches a threshold. In addition, an extra control cap is arranged at the front of the device, and could be rotated to adjust its axial position with regards to the screw and the elastic body. As a result, the resistance provided by the elastic body could be adjusted.

SUMMARY

The present disclosure is directed to inventive methods and apparatus for improved manufacturing of masticating separators, as well as efficient mastication of fruits and vegetables to separate juice from pulp. For example, a juice masticator may include an elastic restrictor adjacent a pulp outlet that is shaped to create, maintain, and/or reinforce a cavity between an inner surface of the juicer and an auger contained within the juicer. The elastic restrictor may also provide variable resistance to pulp being conveyed through the cavity by the auger, so that additional juice may be pressed out from differently-sized fragments of pulp.

Generally, in one aspect, a masticating juicer may include: a housing defining a compression chamber with an inner wall, at least one inlet, at least one juice outlet, and at least one pulp outlet; an auger rotatably mounted within the compression chamber, the auger including upstream and downstream ends and an auger surface in between, the auger being rotatable about an axis of rotation to masticate and convey material along the auger surface in a downstream direction from the upstream end towards the downstream end, the auger sized so that a cavity is formed between the auger surface and the inner wall of the compression chamber; and an elastic restrictor extending circumferentially around an interior of the compression chamber to at least partially span the cavity, the elastic restrictor shaped to provide variable resistance to material conveyed by the auger depending on a relative position of the material between the inner wall and the auger surface.

In various embodiments, the elastic restrictor may entirely span the cavity to contact the auger surface of the auger. In various embodiments, the elastic restrictor may have a triangular cross section part. In various embodiments, the elastic restrictor may taper in a direction across the cavity between the inner wall of the compression chamber and the auger surface. In various embodiments, the elastic restrictor may include, at a distal end, two distinct chamfered surfaces, one chamfered surface upstream of the other. In various versions, one of the two distinct chamfered surfaces may extend farther across the cavity than another of the two distinct chamfered surfaces.

In various embodiments, the elastic restrictor may include a first oblique surface that faces upstream, wherein the transition surface is oblique to both the inner wall of the compression chamber and the auger surface. In various embodiments, the elastic restrictor may be located upstream of the downstream end of the auger. In various embodiments, the elastic restrictor may be mounted on the inner wall of the compression chamber or on the auger surface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Masticating separators, or "juicers," may be designed to process various material, typically fruits and/or vegetables, to separate juice from pulp. Various fruits and vegetables may be used, including but not limited to apples, carrots, grapes, watermelon, tomato, pineapple, and so forth. In some masticating juicers, an auger or drill is rotatably mounted within a compression chamber so that its rotation masticates and conveys material downstream towards a pulp outlet while separated juice exits a separate, juice outlet. In order to press juice from pulp, a cavity between an outer surface of the auger and an inner surface of the compression chamber may grow increasingly narrow in a downstream direction. Such a narrow cavity may be difficult and/or expensive to reliably mass produce due to inherent tolerances of individual parts. Thus, Applicants have recognized a need in the art to reduce the effect that tolerances of individual parts has on such a cavity. More generally, Applicants have recognized and appreciated that it would be beneficial to more efficiently separate juice from fruits and/or vegetables. In view of the foregoing, various embodiments and implementations of the present invention are directed to masticating juicers with elastic restrictors that create, maintain, and/or reinforce a cavity between inner surfaces of masticating juicers and corresponding augers.

Figure 1:
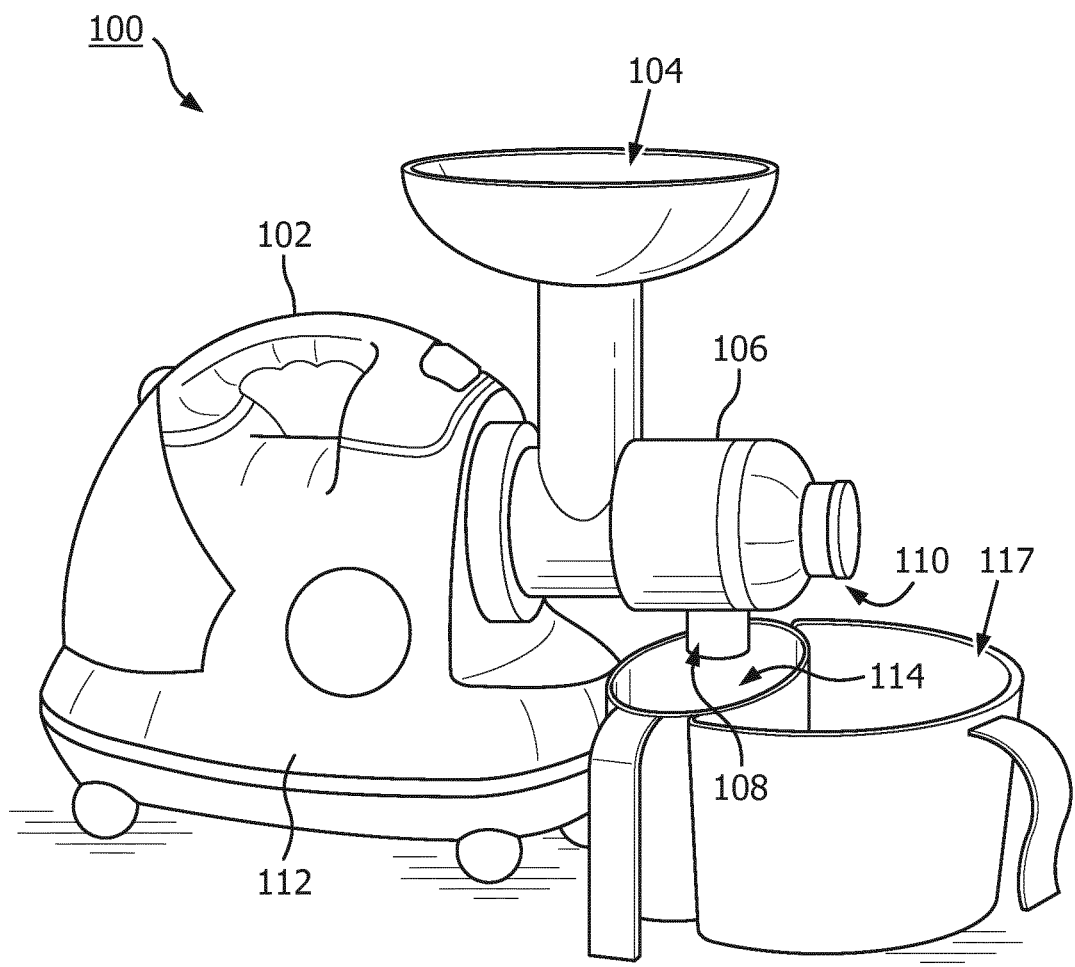
FIG. 1 is a perspective view of a masticating juicer, in accordance with various embodiments.

Referring to FIG. 1, in one embodiment, a masticating juicer 100 may include a housing 102 with a hopper input 104 for receiving food stuffs (typically, but not necessarily, fruits and vegetables). Hopper input 104 may be an entrance to a compression chamber 106. Compression chamber 106 may include at least one juice outlet 108 and at least one pulp outlet 110. An operational compartment 112 may include various mechanisms (not depicted) to rotate an auger (not depicted in FIG. 1) within compression chamber 106, such as an electric motor, a hand-operated gear train assembly, and so forth. Compression chamber 106 may be arranged parallel to a surface (not depicted) on which masticating juicer 100 rests, though that is not required. This particular arrangement may be referred to as a "horizontal masticating juicer."

Juice outlet 108 may be positioned in various locations. In FIG. 1, for instance, juice outlet 108 is positioned on an underside of compression chamber 106, so that it expels juice into a juice reservoir 114. However, in other embodiments, juice outlet 108 may be in other positions, and there may be multiple juice outlets at various locations that may expel juice at various stages of a mastication process. In the example masticating juicer 100 of FIG. 1, pulp outlet 110 is located near a terminal end of compression chamber 106, but this is not required. Pulp output 110 may be positioned to expel pulp into a pulp reservoir 117, so that the pulp may be discarded or put to use if desired.

Figure 2:
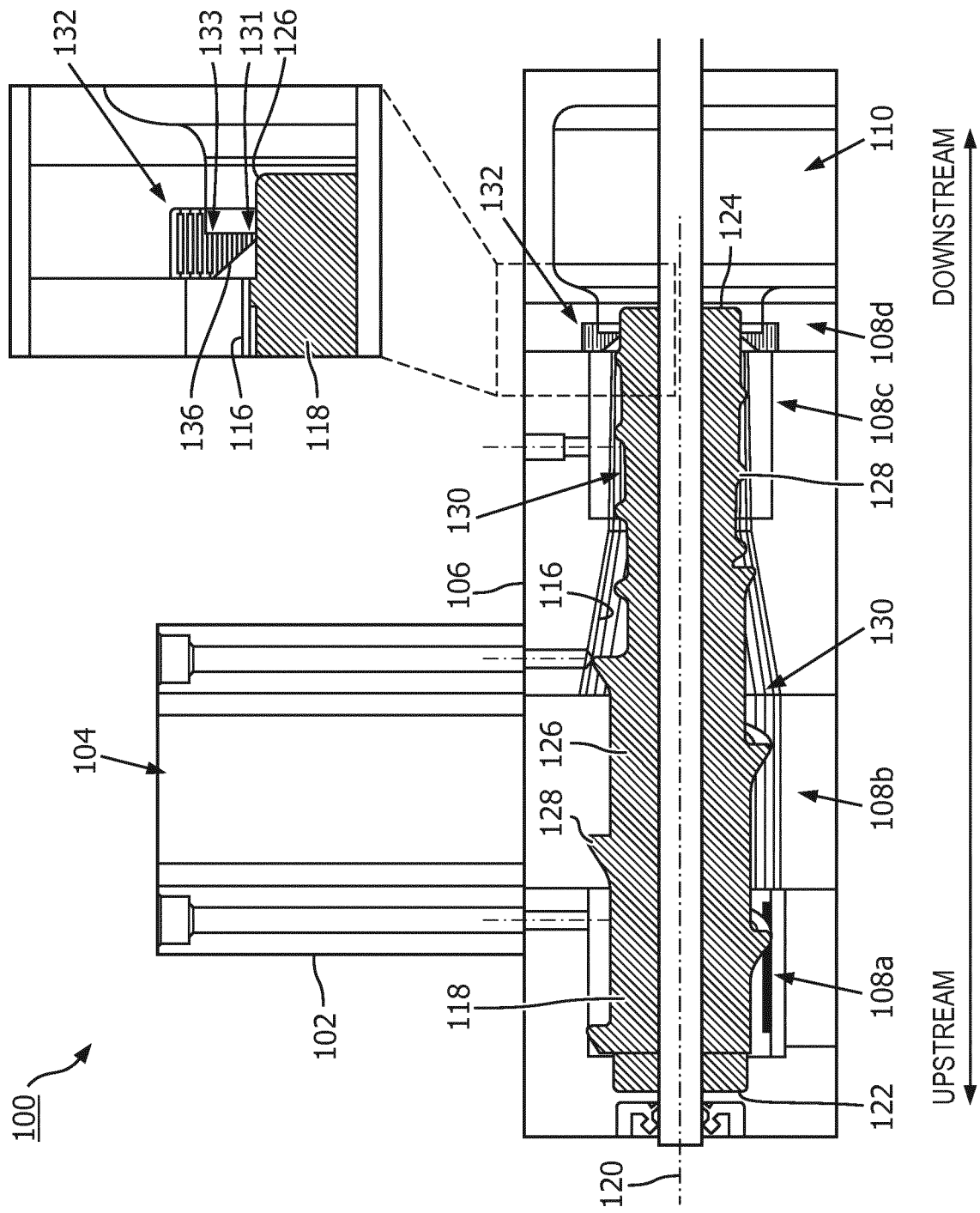
FIG. 2 is a cross-sectional view of a compression chamber showing various components that may cooperate to separate juice from materials such as fruits and vegetables, in accordance with various embodiments.

FIG. 2 is a cross-sectional view of compression chamber 106 of a masticating juicer 100. Compression chamber 106 in this example includes hopper input 104, pulp output 110, and two juice outputs 108a and 108b. Other arrangements of inputs and outputs are contemplated. In various embodiments, compression chamber 106 may be shaped in various ways. In the embodiment of FIG. 2, compression chamber 106 includes a generally-cylindrical inner wall 116. While generally cylindrical, a diameter of inner wall 116 may vary, with various transitional surfaces separating various portions of various diameters, as will be described below, and may narrow in some embodiments generally in a downstream direction (i.e. to the right in FIG. 2). An auger 118 may be rotatably mounted within compression chamber 106 and may be rotatable about an axis of rotation 120. In some embodiments, the axis of rotation 120 may be parallel to a longitudinal axis of compression chamber 106, although this is not required.

Auger 118 may include an upstream end 122, a downstream end 124, and a auger surface 126 in between upstream end 122 and downstream end 124. Auger surface 126 may include one or more spiral blades 128. Rotating auger 118 may cause spiral blades 128 to also rotate, which in turn may masticate and convey material such as fruits and/or vegetables from a position adjacent hopper input 104 along auger surface 126 in a downstream direction (left to right in FIG. 2) from upstream end 122 towards downstream end 124.

In various embodiments, auger 118 may have a variable diameter that, along with inner wall 116 of compression chamber 106, defines a variable-diameter cavity 130 between auger surface 126 of auger 118 and inner wall 116. As noted in the background, various portions of cavity 130, particularly closer to downstream end 124 of auger 118, may be relatively narrow, e.g., between 0.02 and 0.05 mm. Tolerances of the various individual parts that define cavity 130, such as auger 118 and compression chamber 106, may be such that reliably mass producing such tight cavities may be difficult, and cavities across products may have somewhat different sizes, which in turn may unacceptably vary juice output. Moreover, if cavity 130 is strictly defined only by auger surface 126 and inner wall 116 of compression chamber 106, there is no variation in dimensions of cavity 130 when dealing with fruits or vegetables of varying sizes and hardness.

Accordingly, in various embodiments, and as shown best in the blown up portion of FIG. 2, an elastic restrictor 132 may be provided to create, maintain, and/or reinforce cavity 130 between auger 118 and inner wall 116 of compression chamber. Elastic restrictor 132 may additionally or alternatively be shaped and/or positioned to provide additional resistance to pulp travelling downstream, thereby extracting more juice than might be extracted without elastic restrictor 132.

In various embodiments, elastic restrictor 132 may extend circumferentially around an interior of compression chamber 106, e.g., generally about axis of rotation 120. In various embodiments, elastic restrictor 132 may be positioned within compression chamber 106 upstream (i.e. to the left in FIG. 2) of downstream end 124 of auger 118. In various embodiments, elastic restrictor 132 may extend radially in a direction between inner wall 116 and auger surface 126 to at least partially span cavity 130. The spanning of cavity 130 by elastic restrictor 132 may serve at least two purposes: to provide resistance to material conveyed downstream (i.e. to the right in FIG. 2) through cavity 130 by auger 118; and to create, maintain, and/or reinforce a separation between auger 118 and inner wall 116. In some embodiments, elastic restrictor 132 may extend radially inward entirely across cavity 130. In other embodiments, elastic restrictor 132 may extend less than the entire distance across cavity 130.

Elastic restrictor 132 may be shaped in various ways to provide various levels of resistance (e.g., upstream force) to material such as pulp conveyed downstream by auger 118. In some embodiments, elastic restrictor 132 may be shaped to provide variable resistance to material conveyed by auger 118 depending on a relative position of the material between the inner wall 116 and auger surface 126. For example, in some embodiments, elastic restrictor 132 may taper radially between inner wall 116 and auger surface 126. For example, a cross-sectional width of elastic restrictor 132 in FIG. 2 may be greater near inner wall 116 than near auger surface 126, and thus may offer greater resistance to material such as pulp near inner wall 116 than near auger surface 126. In other embodiments, the opposite may be true. This may increase juice output from harder fruits and vegetables (e.g., carrots, beet roots) and/or from larger chunks of pulp.

Suppose a relatively hard vegetable such as a carrot and a relatively soft fruit such as a piece of watermelon are both fed into hopper input 104, one after another or at the same time. As these materials are masticated between auger surface 126 and inner wall 116, auger 118 may simultaneously convey the resulting pulp downstream (i.e. to the right in FIG. 2). Because the carrot is harder and tougher than the watermelon, pieces of carrot pulp may be larger than pieces of watermelon pulp when they reach elastic restrictor 132. The smaller pieces of watermelon pulp (which may be, for instance, 0.1 to 0.3 mm in size) may be driven by various forces (e.g., pressure, gravity) towards a distal end 131 of elastic restrictor 132. The larger, tougher pieces of carrot may be driven by various forces (e.g., pressure, gravity, resistance of watermelon pieces near a distal end 131 of elastic restrictor 132) towards a proximal end 133 of elastic restrictor 132. At proximal end 133, pieces of carrot (which may be, for instance, between 0.5 and 2 mm in size) may press against elastic restrictor 132, which may deform to various degrees (e.g., by up to 2 mm). This deformation in turn may provide more resistive force to the carrot pulp, thereby extracting more juice.

Figure 3:
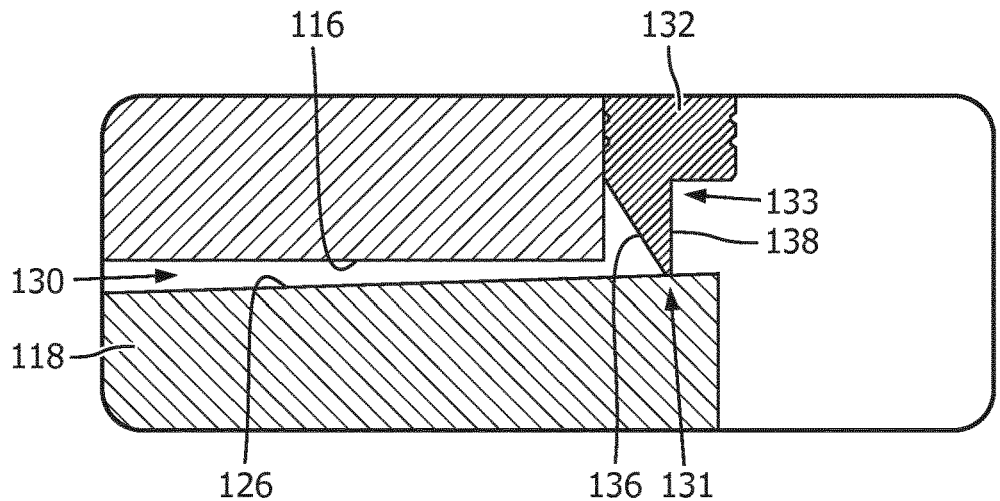
FIGS. 3-8 are a cross-sectional views of various embodiments of an elastic restrictor.

FIG. 3 depicts a close-up cross sectional view of an elastic restrictor 132 similar to that of FIG. 2. In this embodiment, elastic restrictor 132 includes a first surface 136 that, in cross section, is oblique to both auger surface 126 and inner wall 116 so that it faces upstream (i.e. left in FIG. 3). In this embodiment, elastic restrictor 132 also includes, downstream of the first oblique surface 136, a second surface 138 that is, in cross section, substantially perpendicular to both auger surface 126 and inner wall 116, and faces downstream (i.e. right in FIG. 3).

Figure 4:
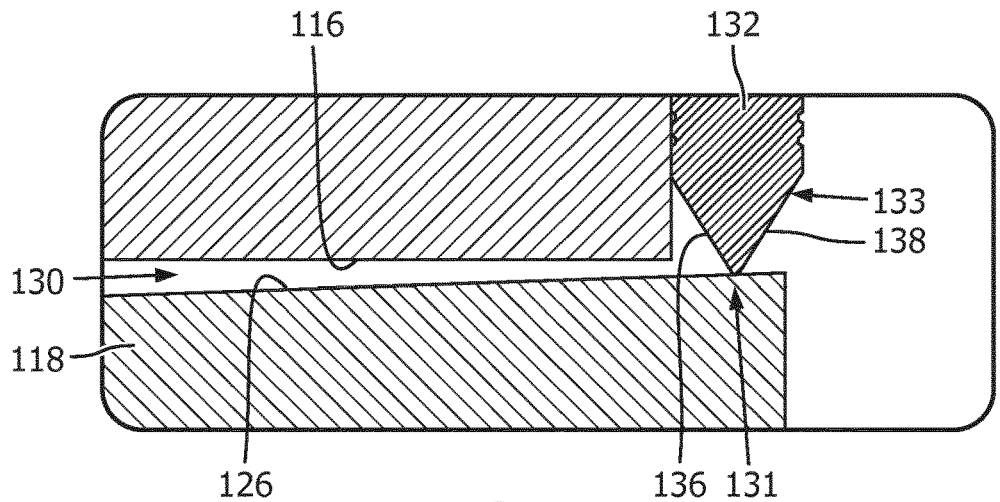
Figure 5:
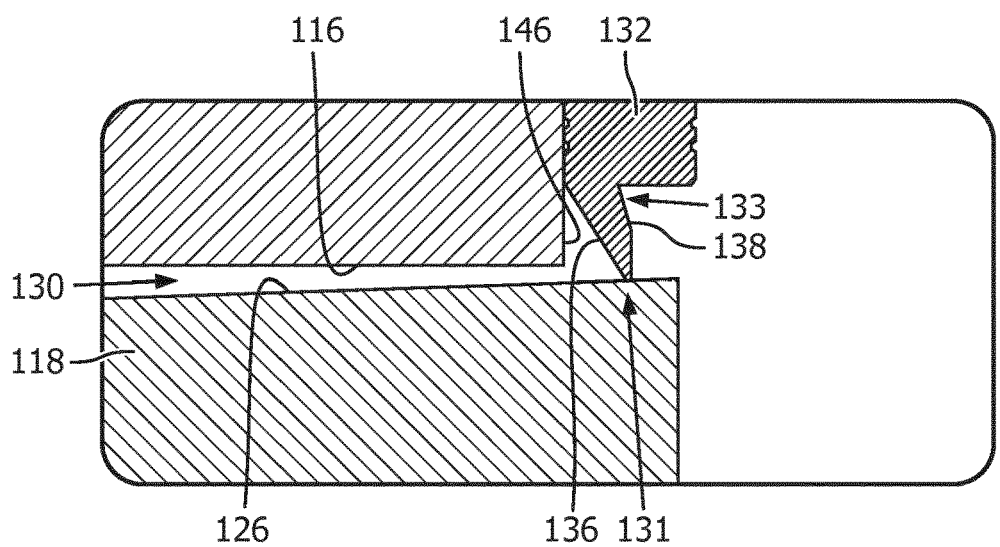

FIGS. 4 and 5 depict variations of elastic restrictor 132 that are similar to that of FIG. 3 except that second surface 138 is, in cross section, oblique to both auger surface 126 and inner wall 116, and faces downstream (i.e. right in FIGS. 4 and 5). In FIG. 4, oblique second surface 138 has a substantially opposite slope of first surface 136, so that a cross section of elastic restrictor 132 is triangular. By contrast, in FIG. 5, oblique second surface 138 may have a slope that is varied somewhat from that of first surface 136, selected so that elastic restrictor 132 nonetheless provides variable resistance depending on a distance from proximal end 133.

In various embodiments, a circumferential pulp calibration chamber 148 may be defined in cavity 130, e.g., immediately upstream of elastic restrictor 132. This chamber 148 may serve to calibrate pulp by chuck size, e.g., by acting as a de facto pulp "buffer." Larger pieces of pulp may be directed within the chamber 148 to be closer to proximal end of 133 of elastic restrictor 132. Smaller pieces of pulp may be directed within the chamber 148 closer to distal end 131 of elastic restrictor 132.

Examples of how a circumferential pulp calibration chamber 148 may be defined are depicted in FIGS. 3-5. In these examples, inner wall 116 of compression chamber 106 may include a transition surface 146 that extends radially between wall 116 and auger surface 126, upstream of elastic restrictor 132, to define a circumferential pulp calibration channel 148 in cavity 130 immediately upstream of elastic restrictor 132. In FIGS. 3-5, transition surface 146 is substantially perpendicular to inner wall 116. However, this is not required, and in other embodiments, transition surface 146 may be oblique to inner wall 116.

Figure 6:
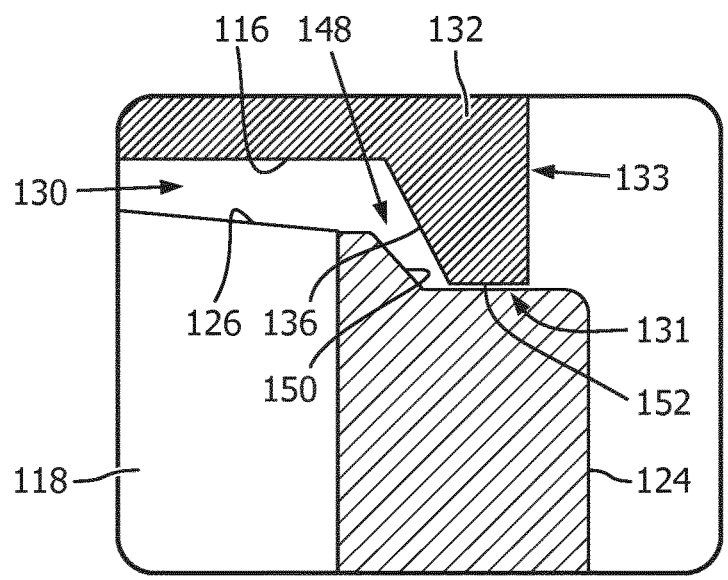
Figure 7:
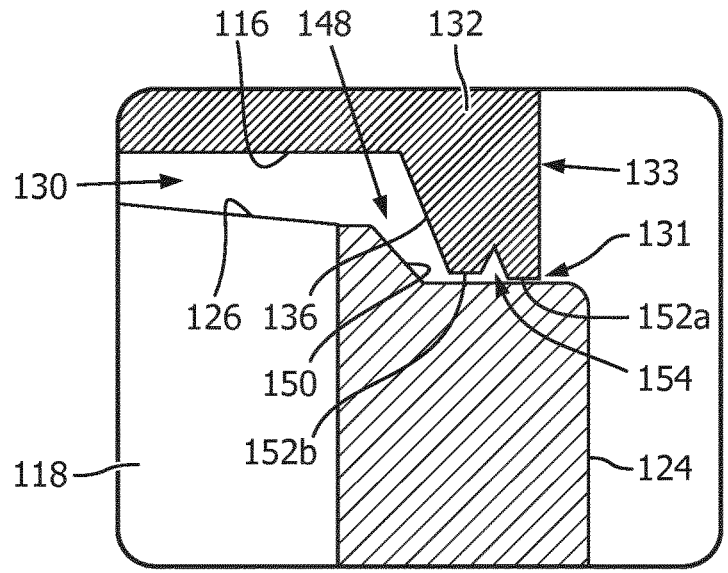
Figure 8:
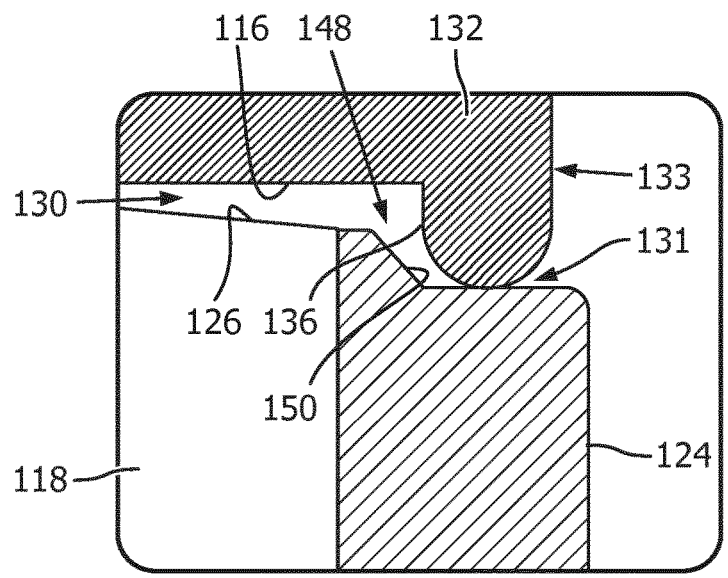

FIGS. 6-8 depict more examples of how a circumferential pulp calibration chamber may be defined. In these examples, inner wall 116 may not include a transition surface. Instead, auger 118 may include transition surface 150 that extends radially between inner wall 116 and auger surface 126 to define a circumferential pulp calibration channel 148 in cavity 130 immediately upstream of elastic restrictor 132. In the embodiments of FIGS. 6 and 7, transition surface 150 is, in cross section, oblique to inner wall 116, but this is not required.

In some embodiments, elastic restrictor 132 may have other cross sectional shapes that are different than those depicted in FIGS. 3-5. For example, in FIG. 6, elastic restrictor 132 includes, at a distal end 131, a chamfered surface 152 facing auger surface 126 of auger 118. As noted above, in some embodiments, elastic restrictor 132 may completely span cavity 130. In other embodiments, elastic restrictor 132 may partially span cavity 130. In some such embodiments, chamfered surface 152 may or may not contact auger surface 126 at various points about axis of rotation 120 of auger 118, depending on manufacturing tolerances of various constituent parts and how precisely they are assembled. In this manner, a cross-sectional height of elastic restrictor 132 (e.g., a distance from inner wall 116 to chamfered surface 152) may ensure that cavity 130 has at least a certain width to permit conveyance and/or mastication of material.

In FIG. 7, elastic restrictor 132 may include, at a distal end 131, two distinct chamfered surfaces 152a and 152b, one upstream of the other. In this example, both surfaces generally face auger surface 126 of auger 118. In some embodiments, such as the one depicted in FIG. 7, one of the two distinct chamfered surfaces, 152a in this instance, extends farther across cavity 130 than the other of the two distinct chamfered surfaces, in this instance 152b. In some embodiments, a circumferential channel 154 may be defined between chamfered surfaces 152a and 152b.

In FIG. 8, elastic restrictor 132 has a rounded shape that is different than other embodiments depicted in previous Figures. However, in general, elastic restrictor 132 in FIG. 8 is still thicker at its proximal end 133 than its distal end 131. Accordingly, elastic restrictor 132 of FIG. 8 may provide variable resistance to pulp depending on a relative position of the pulp between auger surface 126 and inner wall 116, similar to other embodiments described herein.

Figure 9:
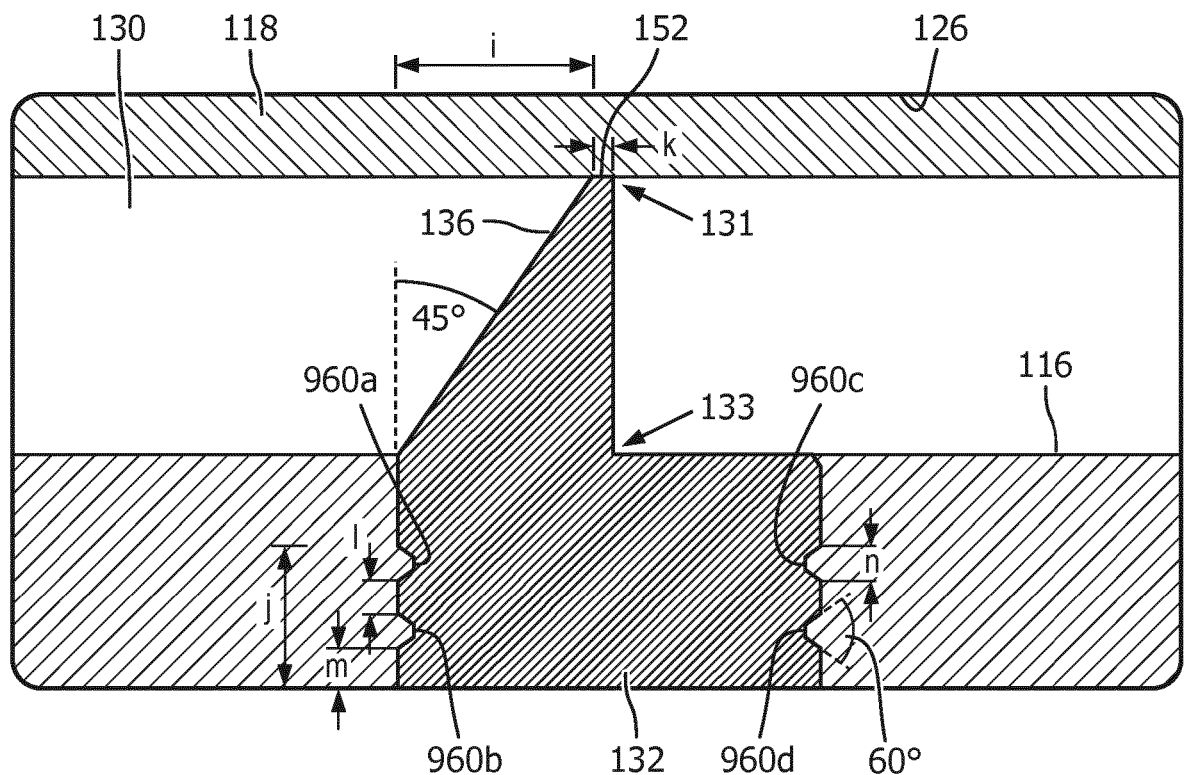
FIG. 9 is a close-up cross-sectional view of an embodiment of an elastic restrictor, in accordance with various embodiments.

FIG. 9 depicts in more detail than FIGS. 2-8 a cross-section of an example elastic restrictor 132, in accordance with various embodiments. Unlike FIGS. 3-8, this cross-sectional view of elastic restrictor 132 is from a bottom of compression chamber 106, which means it tapers in an upward, rather than downward, direction on the page. Various dimensions are labeled i-m and may have various values. In this example, each distance may have a tolerance of ±0.05 mm, but that is not meant to be limiting. For example, the distance i may in some embodiments be approximately 3.5 mm. The distance j may in some embodiments be approximately 2.2 mm. A chamfered top surface 152 may have a width k that may be approximately 0.3 mm.

Various recesses 960a-d may be formed in elastic restrictor 132. In some embodiments, recesses 960a and 960b may be separated from each other by a distance, l, of approximately 0.4 mm. The same may be true for a distance between recesses 960c and 960d. An outer width, n, of recesses 960a-d may be approximately 0.75 mm, and the recesses 960a-d may define opening angles of approximately 60 degrees. A distance, in, below recesses 960b and 960d may be approximately 0.3 mm. In some embodiments, an angle between oblique surface 136 and a vertical line that extends radially outward from rotational axis 120 (not depicted in FIG. 9) may be approximately 45 degrees, though other angles are contemplated.

Elastic restrictor 132 may be constructed from various materials. In some embodiments, elastic restrictor 132 may be constructed with rubber. In some embodiments, elastic restrictor 132 may be constructed with one or more polymers. In some embodiments, elastic restrictor 132 may be constructed with silicone. In various embodiments, elastic restrictor may be constructed with various combinations of one or more rubbers, polymers, and/or silicones. In various embodiments, elastic restrictor 132 may be constructed to have various densities, universally throughout and in particular locations. In some embodiments, elastic restrictor 132 may be produced as part of a two-component molding process (e.g., along with compression chamber 106), or may be produced as a separate part.

In many of the embodiments described herein, elastic restrictor 132 is depicted as mounted to extend circumferentially around inner wall 116 of compression chamber 106. However, that is not meant to be limiting. In other embodiments, elastic restrictor 132 may be mounted on other surfaces, such as on a portion of auger surface 126 void of spiral blade structure. In such instances, elastic restrictor 132 may have a greater cross-sectional width near the outer surface of auger 118, and may taper in a radial direction from auger 118 toward inner wall 116 of compression chamber 106. The processes described above as to where differently-sized chunks of pulp may be driven may be reversed. Smaller chunks of pulp may be driven towards inner wall 116, near distal end 131 of elastic restrictor 132. Larger chunks of pulp may be driven towards the outer surface of auger 118, near a proximal end 133 of elastic restrictor 132.

Figure 10:
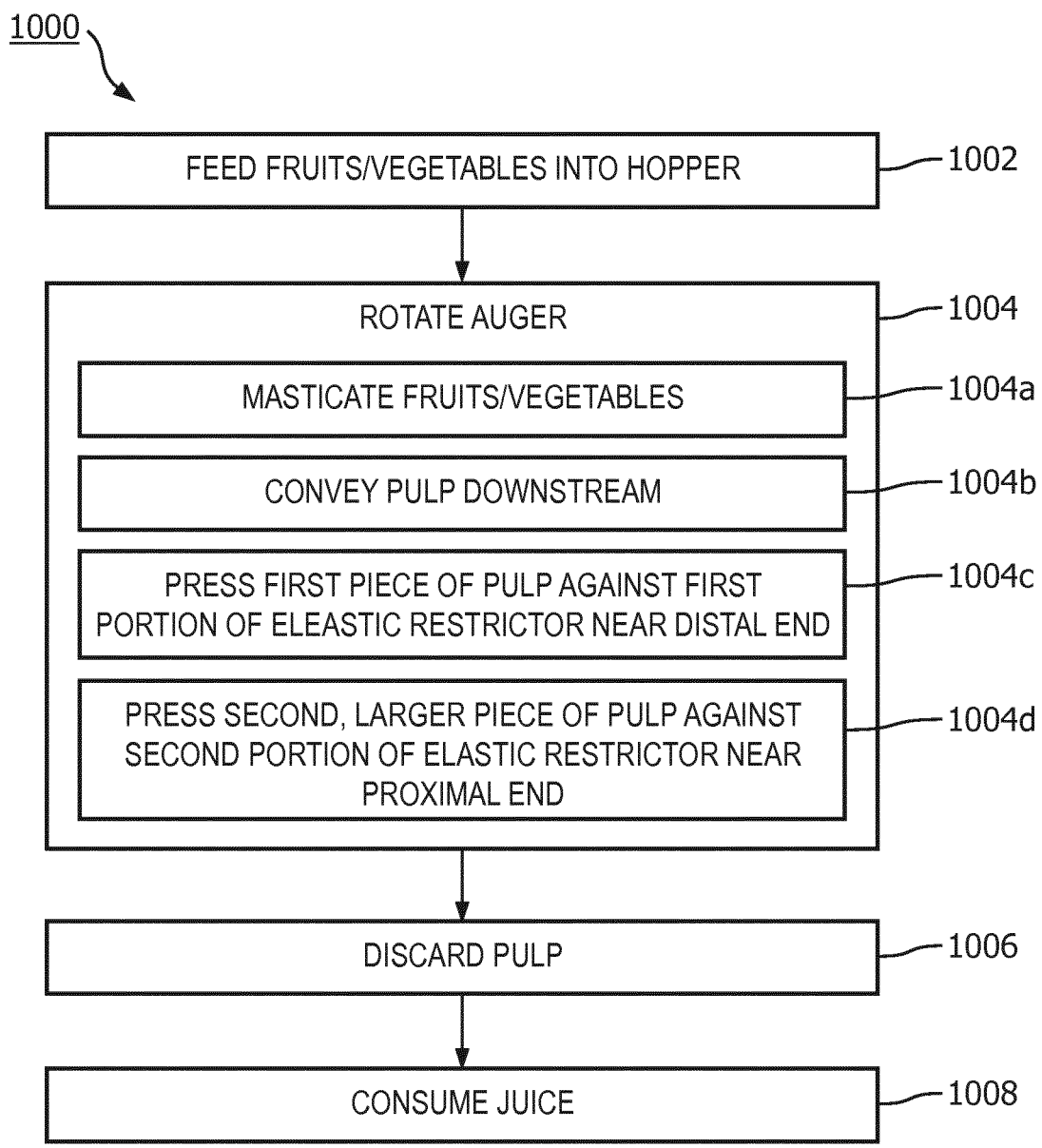
FIG. 10 depicts an example method of separating juice from materials such as fruits and vegetables, in accordance with various embodiments.

FIG. 10 depicts an example method 1000 of masticating material such as fruit and vegetables (or pieces thereof) to extract juice, in accordance with various embodiments. At block 1002, one or more fruits and/or vegetables, from which it is desired that juice be extracted, may be fed into hopper input 104. At block 1004, auger 118 may be rotated about rotational axis 120 within compression chamber 106. In some embodiments, one or more switches, dials or buttons on masticating juicer 100 may be actuated or otherwise operated to start a motor or other similar mechanism within operational compartment 112, which in turn may rotate auger 118.

Rotation of auger 118 at block 1004 may cause various other events to occur. For example, at block 1004a, the one or more fruits or vegetables that were fed into hopper input 104 at block 1002 may be masticated into smaller pieces, e.g., by one or more spiral blades 128 of auger 118. Rotation of auger 118 may additionally cause spiral blades 128 to convey masticated materials such as pulp and juice downstream at block 1004b. At block 1004c, a first piece of pulp may be pressed against a first portion of elastic restrictor 132, e.g., on oblique surface 136 adjacent distal end 131. At block 1004d, a second, larger piece of pulp may be pressed against a second portion of elastic restrictor, e.g., on oblique surface 136 adjacent proximal end 133, and may face greater upstream resistive force than faced by the first piece at block 1004c. In various embodiments, the operations of blocks 1004c and 1004d may be facilitated by calibrating different sized chunks within circumferential pulp calibration channel 148. At block 1006, pulp expelled from pulp outlet 110 may be collected and/or discarded (or otherwise used, e.g., for pie filling or other purposes). At block 1008, extracted juice may be consumed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A masticating juicer, comprising:
a housing defining a compression chamber with an inner wall, at least one inlet, at least one juice outlet, and at least one pulp outlet;
an auger rotatably mounted within the compression chamber, the auger including upstream and downstream ends and an auger surface in between, the auger being rotatable about an axis of rotation to masticate and convey material along the auger surface in a downstream direction from the upstream end towards the downstream end, the auger being sized so that a cavity is formed between the auger surface and the inner wall of the compression chamber; and
an elastic restrictor extending circumferentially around an interior of the compression chamber to at least partially span the cavity, from a proximal end to a distal end of the elastic restrictor,
wherein the elastic restrictor is shaped to provide variable resistance to material conveyed by the auger depending on a relative position of the material across the cavity between the inner wall and the auger surface,
wherein the elastic restrictor further includes, at the distal end, two distinct chamfered surfaces, wherein one distinct chamfered surface is disposed upstream of the other, wherein the upstream distinct chamfered surface extends partially across the cavity and the other distinct chamfered surface extends across the cavity further than the upstream distinct chamfered surface, and wherein the elastic restrictor further comprises a circumferential channel, disposed at the distal end, between the upstream distinct chamfered surface and the other distinct chamfered surface.

2. The masticating juicer of claim 1, wherein the other distinct chamfered surface of the elastic restrictor entirely spans the cavity to contact the auger surface of the auger.

3. The masticating juicer of claim 1, wherein the elastic restrictor has a triangular cross section part.

4. The masticating juicer of claim 1, wherein the elastic restrictor tapers in a direction across the cavity between the inner wall of the compression chamber and the auger surface.

5. The masticating juicer of claim 1, wherein the elastic restrictor includes a first oblique surface that faces upstream, and a transition surface that is oblique to both the inner wall of the compression chamber and the auger surface.

6. The masticating juicer of claim 1, wherein the elastic restrictor is located upstream of the downstream end of the auger.

7. The masticating juicer of claim 1, wherein the elastic restrictor is mounted on the inner wall of the compression chamber.

8. The masticating juicer of claim 1, wherein the elastic restrictor is mounted on the auger surface.

9. The masticating juicer of claim 1, for separating fruit or vegetable juice from fruit or vegetable pulp, wherein the elastic restrictor includes a surface that faces upstream and is oblique to both the inner wall of the compression chamber and an outer surface of the auger.

10. The masticating juicer of claim 9, wherein the elastic restrictor is located upstream of a downstream end of the auger.

11. The masticating juicer of claim 9, wherein the inner wall of the compression chamber or the outer surface of the auger includes a radially-extending transition surface upstream of the elastic restrictor that defines a circumferential pulp calibration channel in the cavity immediately upstream of the oblique surface of the elastic restrictor.

12. The masticating juicer of claim 9, wherein the elastic restrictor includes, at a distal end, one or more distinct chamfered surfaces that face the outer surface of the auger.

* * * * *